(12) United States Patent
Bächer et al.

(10) Patent No.: US 10,933,623 B2
(45) Date of Patent: Mar. 2, 2021

(54) OPTIMIZING 3D PRINTED LARGE-SCALE STRUCTURES UNDER WORST-CASE LOADS

(71) Applicant: DISNEY ENTERPRISES, INC., Burbank, CA (US)

(72) Inventors: Moritz Niklaus Bächer, Zurich (CH); Christian Gabriel Schumacher, Zurich (CH); Jonas Alois Zehnder, Montreal (CA)

(73) Assignee: Disney Enterprises, Inc., Burbank, CA (US)

( * ) Notice: Subject to any disclaimer, the term of this patent is extended or adjusted under 35 U.S.C. 154(b) by 124 days.

(21) Appl. No.: 16/136,520

(22) Filed: Sep. 20, 2018

(65) Prior Publication Data

US 2019/0366703 A1 Dec. 5, 2019

Related U.S. Application Data

(60) Provisional application No. 62/680,397, filed on Jun. 4, 2018.

(51) Int. Cl.
*B33Y 50/02* (2015.01)
*G06F 30/17* (2020.01)
(Continued)

(52) U.S. Cl.
CPC ............ *B33Y 50/02* (2014.12); *B22F 3/1103* (2013.01); *B33Y 40/00* (2014.12); *G06F 30/17* (2020.01);
(Continued)

(58) Field of Classification Search
CPC ..... B33Y 50/02; B33Y 40/00; G06F 17/5018; G06F 2217/12; B28B 1/001; B22F 3/008;
(Continued)

(56) References Cited

U.S. PATENT DOCUMENTS

| 2008/0300831 A1* | 12/2008 | Taggart | G06F 17/5018 703/1 |
| 2016/0067928 A1* | 3/2016 | Mark | B29C 64/209 264/401 |
| 2017/0343984 A1* | 11/2017 | Czinger | G05B 19/4099 |

OTHER PUBLICATIONS

Digital Engineering, COMSOL Multiphysics Version 4.2 Released, May 20, 2011, Retrieved from the internet on Dec. 10, 2019 <URL: https://www.digitalengineering247.com/article/comsol-mutliphysics-version-4-2-released> (Year: 2011).*

(Continued)

*Primary Examiner* — Robert E Fennema
*Assistant Examiner* — Jonathan Michael Skrzycki
(74) *Attorney, Agent, or Firm* — Snell & Wilmer L.L.P.

(57) ABSTRACT

A 3D printer system with a structural optimization tool to generate 3D models optimized for build materials such as those used in binder jetting technology-based printers. The structural optimization tool uses a computational approach to optimize mechanical and mass properties of large-scale structures (i.e., objects to be 3D printed), and the computational approach is tailored for fabrication on binder jetting technologies. To spend a material budget for printing an object wisely, the inventors in designing the computational approach turned the Bresler-Pister failure criterion into an objective measuring the potential of failure of an object or structure. This involved modeling the difference in tensile and compressive strength of the build material. To optimize structures under worst-case loads, the computational approach unifies an optimization to identify worst-case loads with an optimization to minimize the resulting failure potential, nesting them with first-order optimality constraints.

22 Claims, 5 Drawing Sheets

(51) Int. Cl.
  *B33Y 40/00* (2020.01)
  *G06F 30/23* (2020.01)
  *B22F 3/11* (2006.01)
  *G06F 119/18* (2020.01)
  *G06F 113/10* (2020.01)

(52) U.S. Cl.
  CPC .......... *G06F 30/23* (2020.01); *G06F 2113/10* (2020.01); *G06F 2119/18* (2020.01)

(58) Field of Classification Search
  CPC ............... B22F 3/1055; B29C 67/0077; F05D 2230/20; F05D 2230/22; F05D 2230/30; F05D 2230/31; F05D 2230/312; F05D 2230/313; F05D 2230/314
  See application file for complete search history.

(56) References Cited

OTHER PUBLICATIONS

Stress Relief: Improving Structural Strength of 3D printable objects, Ondrej Stava et al., Jul. 2012, ACM Transactions on Graphics, vol. 31, No. 4, Article 48, Publication Date: Jul. 2012; Retirved from the internet on Dec. 10, 2019 <URL: http://hpcg.purdue.edu/-bbenes/papers/Stava2012sigg.pdf> (Year: 2012).*

VoxelJet Services Brochure, Voxeljet AG, Mar. 2018, Retrieved from the internet on Dec. 10, 2019 <URL: https://www.voxeljet.com/fileadmin/user_upload/PDFs/Servicebrochure_2018_web_01.pdf> (Year: 2018).*

Wikipedia, Nesting (computing), 2020, Retrieved from the internet on Apr. 13, 2020 URL:<https://en.wikipedia.org/wiki/Nesting_(computing)> (Year: 2020).*

Manfield Merriman, American Civil Engineers' Pocket Book, 1917, John Wiley and Sons Inc., Third edition, p. 289 URL:<https://play.google.com/books/reader?id=1IBVAAAAMAAJ&hl=en&pg=GBS.PA289> (Year: 1917).*

Lu, Lin et al. "Build-to-Last: Strength to weight 3D printed objects" Jul. 2014, ACM Transactions on Graphics, vol. 33, No. 4, Article 97, URL <https://dl.acm.org/doi/pdf/10.1145/2601097.2601168> (Year: 2014).*

* cited by examiner

OPTIMIZING 3D PRINTED LARGE-SCALE STRUCTURES UNDER WORST-CASE LOADS

CROSS REFERENCE TO RELATED APPLICATIONS

This application claims priority to U.S. Prov. Pat. Appl. No. 62/680,397, filed Jun. 4, 2018, which is incorporated herein by reference in its entirety.

BACKGROUND

Field of the Description

The present description relates, in general, to fabrication of larger objects or structures using three-dimensional (3D) printing techniques. More particularly, the present description relates to a 3D printer system (and corresponding method implemented by a processor running code or programs (i.e., software) in such a system) that is configured to optimize the design of large-scale objects or structures, which may be weak in tension, and then using this optimized design as the input print file of a 3D printer provided in the 3D printer system.

Relevant Background

There are many settings, including outdoor malls and plazas, sporting complexes, and theme and amusement parks, where it is desirable to include architectural ornamentation (or "AO"). The architectural ornamentation may be provided in the form of statues, ornate features of walls and buildings, rock work, and so on, and it may be quite large in size such as with dimensions ranging from several inches to many feet. The square foot price for architectural ornamentation can be quite high, and there is an ongoing demand for techniques of fabricating or providing the architectural ornamentation at reduced prices while retaining its attractive appearance and structural strength and durability.

In the construction industry, concrete is the dominating build material, and formwork is used to keep it in place while it transitions from a fluid to a solid state. With usage exceeding two billion tons per year, concrete is the most widely used build material in the world. However, the requirements on formwork puts severe bounds on the geometric complexity of freeform structures that can be created and used as architectural ornamentation. While formwork made of computer numerical control (CNC) milled foam and wood is common, it is single use and, hence, unsustainable and expensive.

Automated construction technologies such as large-scale 3D printing may have the potential to reduce construction costs for architectural ornamentation and other objects or structures. One of the large-scale 3D printing technologies that has reached a high level of maturity is binder jetting. In binder jetting an object, sand is put down layer-by-layer, and binder is used to hold the sand together. The remaining sand is then blown off after printing to complete the 3D printed object. Printers like the Voxeljet VX4000 (available from Voxeljet AG) have a build volume of 4 meters by 2 meters by 1 meter, and a high resolution and precision (e.g., up to 800 dots per inch (dpi) and a layer thickness of 300 microns). In the near future, it is likely that 3D printers with even larger build volumes will become available.

Unfortunately, there are issues with use of large-scale 3D printing technologies to fabricate large objects for many uses including architectural ornamentation. A weakness of binder jetting, for example, is the strength of the build material. To increase the strength, printed structures are infiltrated with materials such as epoxy resin. Interestingly, the infiltrated material displays a similar behavior to concrete in that it is far weaker under tension than under compression. Stated differently, the 3D printed object can withstand significantly more load under compression than under tension. For concrete-like materials, the ratio between the tensile and compressive strengths can be as small as 0.05, and this asymmetry in strength is the reason why concrete is traditionally reinforced with a grid of steel bars or rebar. Analyzing structures under realistic live loads, self-weight, and wind, it can be observed that this asymmetry in strength severely limits the use of binder jetting at the scale of available build tray sizes. Solid models of objects that are hollowed to constant or uniform wall thicknesses showed that the objects would break under even moderate loads.

Hence, there remains a need for improved processes for fabricating large-scale objects for uses including architectural ornamentation.

SUMMARY

Briefly, a 3D printer system (and associated 3D printing method) is provided that utilizes software (e.g., a structural optimization tool) to optimize the design, including outer wall thicknesses and interior support structure, of an object under worst-case loads prior to it being printed such as with binder jetting or another 3D printing technology. The inventors discovered through their work to fabricate a 7-foot tall statue that binder jetting was not useful at this large scale without the use of the structural optimization tool.

The optimization algorithm carried out by the structural optimization tool reduces the volume (and, hence, also the weight) of material needed to 3D print an object or structure by hollowing out the interior and optimizing outer wall thicknesses. Note, experimentation showed that a solid model of this object would fail under realistic load cases as would one with constant or uniform wall thickness that uses the same amount of material as the optimized design. The structural optimization tool takes as input an artist-specified input model and generates a structurally sound, print-ready output model for use by a 3D printer (such as one implementing binder jetting). The output model (or print file) has an optimal strength-to-weight ratio, and the object/structure to be printed is optimized by the structural optimization tool under a set of load cases.

One feature that makes the structural optimization tool unique is its capability to account for asymmetry in the compressive and tensile strengths of the build material. Unlike other structural or topology optimization techniques, the material budget is spent by the tool where needed and does not treat tensile and compressive stresses equally. In this regard, the tool was designed using the Bresler-Pister failure criterion as one design objective. A failure criterion is a function of the state of stress and is parameterized with material-dependent strength parameters. The Bresler-Pister criterion accounts for the asymmetry in the compressive and tensile strengths of concrete-like materials. It provides a means to decide whether a structural design of an object is sound, i.e., if stresses corresponding to specified load cases are inside the failure surface the structure will last but if some are outside the structure could break.

However, the failure criterion does not provide a means to measure the "distance" of stresses to the failure surface, which is a pivotal ingredient to be able to formulate an optimization objective. To overcome this limitation, the structural optimization tool scales the stress state with a factor in the expression for the criterion and then solves for the factor, which makes the factor a function of the stress state. The tool then integrates this scale factor over the parameterized volume and minimizes this objective together with the volume.

With regard to worst-case load optimization, the structural optimization tool supports, in addition to self-weight, other loads including wind, live, and seismic loads. All load cases are considered by the tool simultaneously when optimizing a design for an object or structure that is to be 3D printed. Hence, a second feature of the tool that makes it unique is that it supports or performs worst-case load optimization.

The idea behind this worst-case optimization can be explained with the following two use cases. First, in some outdoor applications, 3D printed objects or structures have to withstand hurricane-grade wind loads. A structural engineer can provide an estimate of the expected magnitude of wind loads. However, it will be unclear from which directions these loads could act on the object. One option to deal with this uncertainty is to sample directions and then optimize with several conditions per load type, but this approach does not scale well and is computationally very costly. Second, the 3D printed object may be located in settings where people tend to climb them. Hence, a structural engineer may specify so-called live loads that act in regions where a person could stand on the 3D printed object. While one has an idea of how heavy the person may be, it can be difficult to tell where exactly a person would be standing on the object. Therefore, it is more natural to specify a region on the object's outer surface where live loads could apply together with their expected magnitudes. To overcome this bottleneck, the structural optimization tool is configured to estimate at every step of the optimization and for each specified load case the worst-case load. The worst-case is in some embodiments defined as the condition that leads to the highest stresses within the object at that particular step of the optimization. After estimation, the tool minimizes these maximal stresses. Interestingly, the tool is formulating and solving a single continuous optimization problem.

With regard to discretization of the design space and to support topological changes, the structural optimization tool uses a level set function to parameterize a surface of the object that separates material from void space. To avoid having to remesh elements cut by this surface, the tool may be adapted to use extended finite elements (XFEM). For extended finite elements, a ridge function may be used for enrichment.

While the output print file of an object generated by the structural optimization tool is well-suited for binder jetting, the optimization carried out by the structural optimization tool is independent of the technology used for printing or construction of a 3D printed object or structure. The level-set and XFEM-based formulation makes the optimization method performed by the structural optimization tool of the 3D printer systems powerful and useful for application to various problem domains, independent of scale of the 3D printed object. While the stress design objective is targeting build materials in construction (asymmetry in strength), the tool supports design objectives that are well suited for other build materials such as metal such that the tool may be used to optimize a wide variety of components, including robotic components, tailored for 3D printing performed with metal as the build or print material.

More particularly, a three-dimensional (3D) printer system is provided for generating optimized 3D print control files and for printing 3D objects optimized to withstand compressive and tensile stresses due to worst-case loads. The system includes a 3D printer adapted for printing 3D objects using a build material (e.g., a binder jetting printer that uses sand or concrete-like material for the build material). The system further includes an optimization system with memory storing a 3D model of an object and a processor executing software code to provide functions of a structural optimization tool. The structural optimization tool takes as input the 3D model of the object, strength and material parameters for the build material, and a set of loads (e.g., parameterized loads as uncertainty can be parameterized here (e.g., the position of the live loads within a particular region or the wind direction for wind loads)). Further, the structural optimization tool processes the input to first generate a set of worst-case loads for the 3D model of the object from the set of loads and to second generate an output print file defining a plurality of wall thicknesses (which may provide the interior structure and may support topological changes) for an optimized version of the 3D model of the object that is adapted to withstand the set of worst-case loads. Additionally, the 3D printer operates to print a 3D object modeling the optimized version of the 3D model of the object using the output print file.

In some cases, the structural optimization tool generates the optimized version of the 3D model of the object by beginning with a uniform wall thickness model and then moving material from regions of lower stresses to regions of higher stresses to define the plurality of wall thicknesses, and the regions of higher stresses are associated with locations of stresses created by the set of worst-case loads. In such cases, the optimized version of the 3D model of the object may be formed by the structural optimization tool to use a predefined volume of the build material and to optimize a strength-to-weight ratio of the printed 3D object by controlling mass distribution. The structural optimization tool can optimize the strength-to-weight ratio by unifying the set of worst-case loads with a strength-to-weight optimization by nesting first-order optimality constraints. This is one important contribution of the new technology described herein. With this nesting, one can formulate a unified, continuous optimization problem.

In the same or other embodiments, the plurality of wall thicknesses (which can define interior structure and can include struts and topological changes) are chosen by the structural optimization tool to satisfy a failure criterion that accounts for differences in compressive and tensile strengths of the printed 3D object. In such embodiments, the failure criterion may be designed based on the Bresler-Pister criterion. The structural optimization tool may initially hollow an interior portion of the 3D model of the object to form a model with outer walls with a uniform thickness prior to defining varying thickness portions (in some cases, this is optimized all at once, with a bound on the minimal thickness), and the tool may insert one or more structural members into the hollowed interior region as part of generating the optimized version of the 3D model of the object to better withstand stresses generated by one or more of the worst-case loads. The set of loads may include a set of unparameterized loads including at least one of self-weight loads and thermal loads. The set of loads may also (or instead) include a set of parameterized loads including at least one of wind loads and live loads, with the uncertainty being parameterized for these kinds of loads.

Note, the structural optimization may now work or be less effective with a user-specified material budget (volume). If thickness optimization is performed, the optimization starts with a thick shell model and starts to remove material. This results in a structure that is as light as possible while withstanding all worst-case loads. For the thickness optimization, struts are not allowed to form (e.g., topological changes are not possible). To ensure a minimal wall thickness, material is only removed from the volume bound by the maximal thickness and the minimal thickness shells. If the input to the system is a solid model (e.g., a statue), the optimization starts with the solid model by removing material in the interior. The topology of the interior is allowed to change (e.g., struts can form). To ensure a minimal wall thickness, the material removal is restricted to the interior, bound by a constant, minimal thickness shell. The boundary of the solid models elsewhere. To compare to designs a user could create without a structural optimization tool, the inventors generated constant thickness models with the same volume as the optimized results and then compared their strengths.

DETAILED DESCRIPTION

Figure 1:
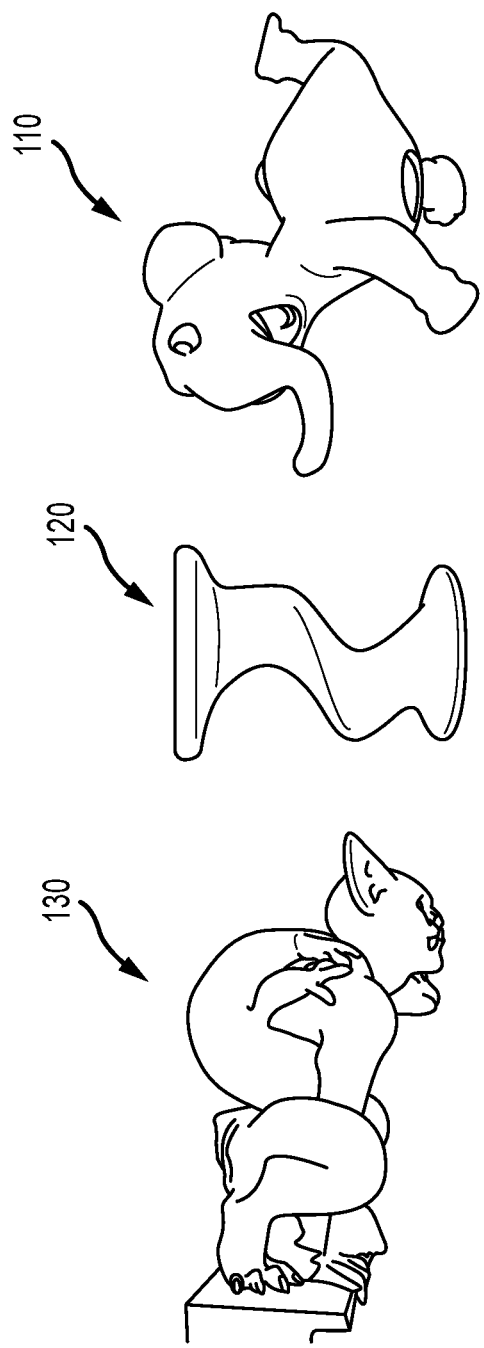
FIG. 1 illustrates three exemplary objects or structures that were printed using an output print file of a structural optimization tool of the present description for controlling a 3D printer, with the understanding that the interior structure that may be optimized via the new tool is not shown.

Briefly, a structural optimization tool (i.e., a software program or set of executable instructions) is taught herein for use in a 3D printer system such as, but not limited to, one that includes a 3D printer using binder jetting technology. The structural optimization tool uses a computational approach to optimize mechanical and mass properties of large-scale structures (i.e., objects to be 3D printed), and the computational approach is tailored for fabrication on binder jetting technologies.

To spend a material budget for printing an object wisely, the inventors in designing the computational approach turned the Bresler-Pister failure criterion into an objective measuring the potential of failure of an object or structure. This involved modeling the difference in tensile and compressive strength of the build material. To optimize structures under worst-case loads, the computational approach unifies an optimization to identify worst-case loads with an optimization to minimize the resulting failure potential, nesting them with first-order optimality constraints. This nesting strategy allows the structural optimization tool to compute analytical gradients of the unified problem and has applications beyond the described worst-case structural optimization.

In the following description, the optimization technique(s) carried out via operations of the structural optimization tool (or a processor running associated code stored in accessible memory) is demonstrated on three 3D printed examples, providing additional optimization results for a structure tailored for printing on the largest available binder jetting 3D printer (a Voxeljet printer, in this case). The optimization tool's usefulness is illustrated with applications in art, furniture design, and architectural ornamentation by optimizing a statue to stably stand (shown as 3D printed object 110 in FIG. 1), a stool to withstand unknown live loads (shown as 3D printed object 120 in FIG. 1), and a gargoyle to be sound under worst-case wind loads with uncertainty in their direction (shown as 3D printed object 130 in FIG. 1). To make the structures last (i.e., objects 110, 120, and 130) and stably stand (i.e., object 110), the structural optimization tool was used to optimize the strength-to-weight ratio and mass properties of the 3D printed structures/objects 110, 120, and 130 under worst-case loads. Given a combination of live, wind, dead, and thermal loads common in structural engineering, the optimization carried out by the new tool/software suite identifies worst-case wind directions and contact regions, minimizing resulting peak stresses. The optimization accounts for the difference in compressive and tensile strength of the build material used in the 3D printing process.

Figure 2:
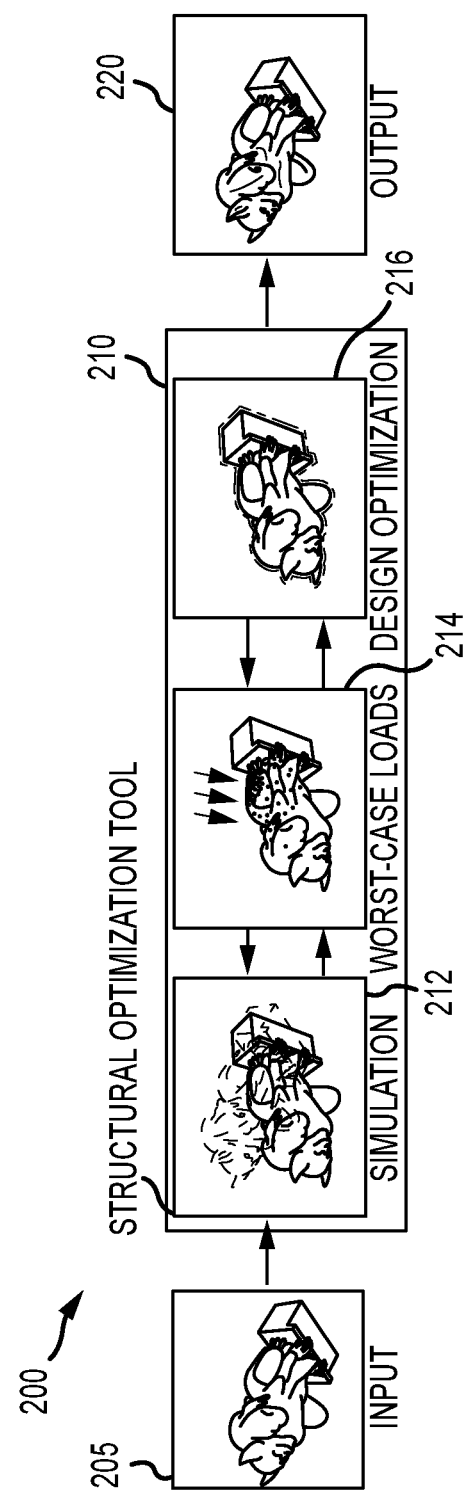
FIG. 2 illustrates an optimization of a structure or object (for 3D printing) performed by a structural optimization tool of the present description.

FIG. 2 illustrates an optimization 200, including data flow, as carried out by a structural optimization tool of the present description. Particularly, the optimization 200 is shown to include input 205 being provided to a structural optimization tool 210, and the input 205 is processed through three optimization stages or subroutines by the tool 210 to produce the output 220 (which may take the form of an output print file useful as a control file for a 3D printer in printing/fabricating an optimized structure or object). The three optimization stages include a simulation stage 212, a worst-case loads stage 214, and a design optimization stage 216. As input 205, the optimization tool 210 takes a 3D model of an object to be printed (such as object 130 of FIG. 1) that defines its outer surfaces and dimensions, parameterized forces, grounded surface regions, and a design space. To optimize the strength-to-weight ratio, the tool 210 first solves for the forces that lead to the highest potential of failure (in stage 214) under static equilibrium constraints (in stage 212). The tool 210 then minimizes this failure potential by hollowing the interior of the object defined in the input model (in the design optimization stage 216), adding objectives to reduce weight and place the center of mass. To unify all three stages 212, 214, and 216 into a single continuous optimization, the tool 210 is configured to enforce first-optimality of the worst-case loads optimization 214 and simulation 212 when solving the design optimization 216. When modeled or 3D printed, the output structure defined in an output print file 220 is sound and withstands worst-case loads drawn from a subspace of uncertainty.

In some cases, the optimization 200 is designed such that the structural optimization tool 210 takes as input 205 a 3D model that fits onto a build tray of a targeted large-scale printer. Besides the 3D model, the user may provide strength and material parameters, may specify a set of unparameterized (e.g., self-weight, thermal loads, and the like) and parameterized loads (e.g., wind, live loads, and the like), and may label a subset of the outer surface of the object of the 3D model as fixed to the ground or to a mounting system. To further put users of the structural optimization tool 210 in control, a graphical user interface (GUI) of the tool 210 may ask the user to specify the design space such as by limiting changes that the tool 210 can make to respective, user-defined regions of the interior structure of the object described by the input 3D model.

Given the input 205, the tool 210 first identifies in stage 214 the parameters p—spanning the uncertainty in the load cases—that lead to the highest potential of failure (see worst-case loads optimization stage discussed below). When optimizing the worst-case loads, the tool 210 in stage 212 enforces a static equilibrium constraint (see simulation optimization stage discussed below), asking the estimated worst-case loads to be in balance with internal forces when evaluating the potential of failure. Given worst-case forces or loads l(p), the tool 210 then minimizes the potential of failure by hollowing the interior in the design optimization stage 216. When solving these second optimization problems, the tool 210 is configured to enforce first-optimality of the worst-case load objective. This nesting of simulation 212, worst-case load optimization 214, and design optimization 216 allows the tool 210 to formulate a unified continuous optimization 200, which enables the computation of analytical gradients through implicit enforcement of first-optimality constraints.

Figure 3:
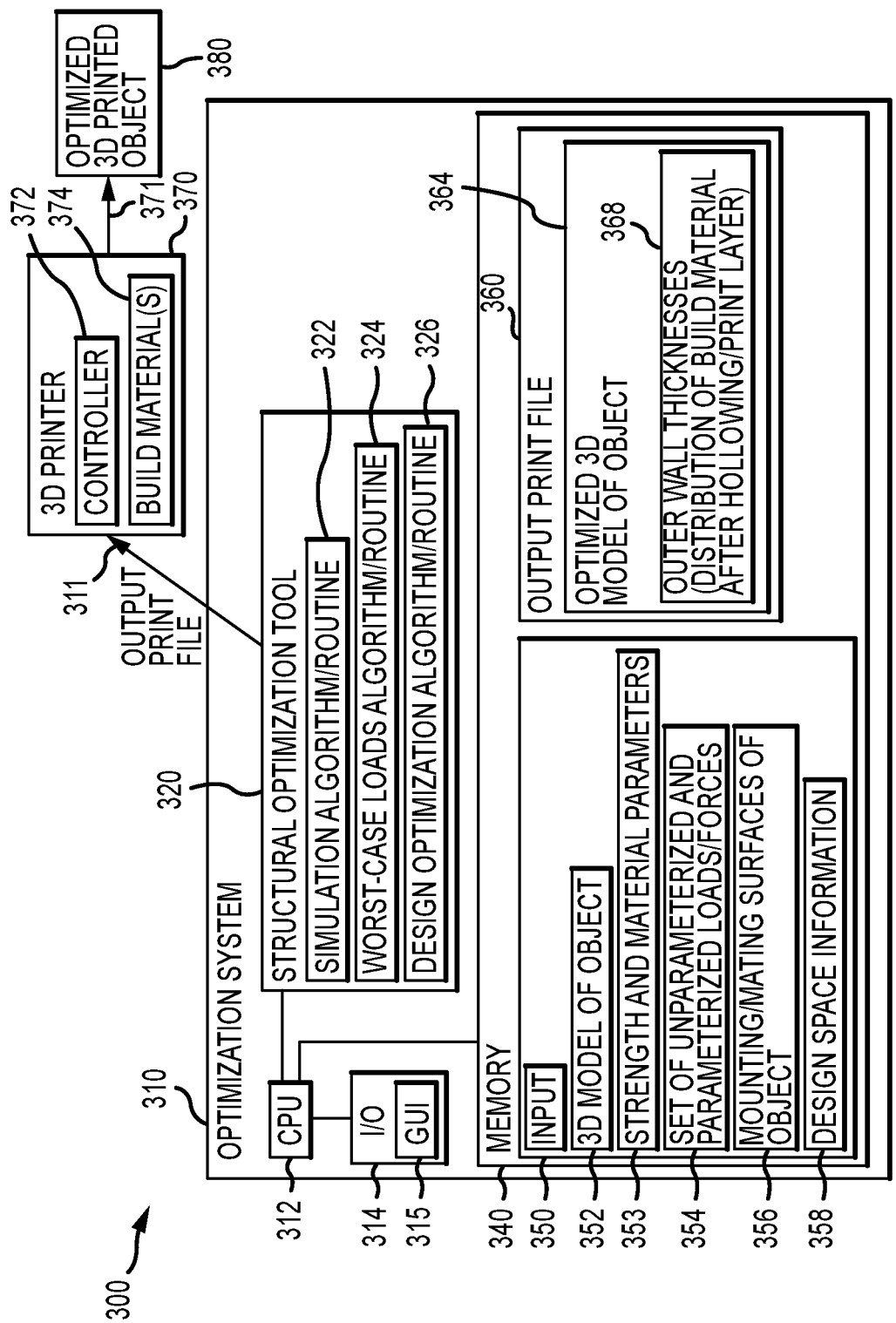
FIG. 3 is a functional block diagram of a 3D printing (or printer) system making use of a structural optimization tool of the present description.

FIG. 3 illustrates a 3D printing (or printer) system 300 of the present description for use in fabricating a 3D printed object, often of a relatively large scale such with dimensions of several to many feet, that is optimized to withstand worst-case loads while having reduced volumes of build materials. As shown, the system 300 includes an optimization system 310 that may take the form of nearly any computer or computing device that is specially configured to perform the optimization functions taught herein including producing an output print file 360 for use as shown at 311 by a controller 372 of a 3D printer (e.g., a binder jetting print device or the like) 370 in printing (layer-by-layer in many cases) 371 an optimized 3D printed object 380. As discussed above, the object 380 typically will be hollow or have a hollow body defined by its outer walls and may have an interior structure that includes struts that can form during optimization, and the thickness of the outer wall (and struts and/or interior structure) is defined to vary among layers or even within a single layer to distribute the build material 374 used by the printer 370 to form the object 380 in a more efficient manner to withstand a wide variety of loads and to otherwise satisfy design objectives for the object 380.

The optimization system 310 includes a processor 312 that executes code/instructions or runs software (stored in memory 340 or otherwise accessible to the processor 312) to provide a structural optimization tool 320 or to provide the functionality of such a tool 320. The structural optimization tool 320 includes a simulation algorithm/routine 322, a worst-case loads algorithm/routine 324, and a design optimization algorithm/routine 326 that perform processing of the optimization stages 212, 214, and 216 as discussed with reference to FIG. 2 (and also in more detail below). The processor 312 also manages operations of input and output (I/O) devices 314 such as a keyboard, a mouse, a touchscreen/pad, a monitor, voice recognition components, and the like, and the tool 320 (or another software module) may be configured to generate a GUI 315 provided via the I/O devices 314 to facilitate a user of the system 300 in providing user input (e.g., all or portions of the input 350 shown stored in memory 340).

The structural optimization tool 320 processes an input file 350 to create an output print file 360, and this output 360 may include an optimized 3D model 364 of the object to be printed by the 3D printer. The model 364 may include definitions of the outer wall thickness throughout the printed object 380 so as to provide an optimized distribution of build material (after hollowing) per print layer. The input 350 includes a 3D model of an object 352 that defines outer surfaces of a structure as well as initial interior structures (e.g., struts, strut thicknesses, strut locations, and the like). Further, the input 350 includes strength and material parameters 353, which may be default values or be input by a user such as via the GUI 315. Also, the user may input a set of unparameterized and parameterized loads/forces as well as a set of the outer surfaces 356 of the object that abut or mate with a support surface or will be attached to a mounting surface/system. Further, the input 350 is shown to include design space information 358, which may include user input limiting changes by the tool 320 during optimization of interior structure of user-defined regions.

The following provides a discussion of failure criteria and an objective to measure distance to failure. The objectives to minimize the weight and place the center of mass of the structure are also discussed to provide an overview over worst-case load and design optimization. Next, applications of the optimization in architectural ornamentation, furniture design, and art are provided to demonstrate the effectiveness of the new optimization processes.

To analyze the soundness of a structure, structural engineers rely on failure criteria: a structure reaches its point of failure if it cannot carry any further load. Failure criteria are functions of the state of stress σ and are parameterized with material-dependent strength values where strength marks the limit state of stress beyond which a structure fractures or yields. To better understand failure criteria, it may be useful to first look at several stress quantities. From the Cauchy stress σ, one can extract the principal stresses $\sigma_1$, $\sigma_2$, and $\sigma_3$. While the Cauchy stress itself depends on the coordinate frame, failure criteria are best defined on quantities that are independent of a particular frame. The invariants $I_1$, $I_2$, and $I_3$ lend themselves to this, where $I_1 = \mathrm{tr}(\sigma) = \sigma_1 + \sigma_2 + \sigma_3$ is most relevant to our context. Among the three invariants, $I_1$ is responsible for volume change. Scaling $I_1$ by a factor, the mean or pure hydrostatic stress $$\sigma_m = \frac{1}{3} I_1$$

can be formed.

The pure hydrostatic stress, in turn allows the Cauchy stress to be decomposed into a stress component causing pure shear and one responsible for volume change $\sigma = s + \sigma_m \mathbf{1}$. Referred to as deviatoric stress, the tensor s shares the principal directions with σ while its principal stresses $s_i = \sigma_i - \sigma_m$ are shifted by the mean stress. By construction, the first invariant $J_1 = \mathrm{tr}(s) = s_1 + s_2 + s_3$ is zero and confirms that s does not cause the volume to change. Relevant in our context is the second invariant $$J_2 = \frac{1}{3} I_1^2 - I_2 = \frac{1}{2}(s_1^2 + s_2^2 + s_3^2)$$

of pure shear.

The separation into a pressure and a shear component provides the following geometric insight: for a given stress tensor σ with principal stresses ($\sigma_1$, $\sigma_2$, $\sigma_3$), coordinates ($\xi$, $\rho$, $\theta$) can be computed:

$$\xi = \frac{1}{\sqrt{3}} I_1$$

$$\rho = \sqrt{2J_2}$$

$$\theta = \arccos\left(\left(\frac{\sqrt{3}}{2}\right)\left(\frac{s_1}{\sqrt{J_2}}\right)\right)$$

where $\xi$ is the hydrostatic coordinate along the normalized hydrostatic pressure axis $\sigma_1 = \sigma_2 = \sigma_3$ and $\rho$ the deviatoric coordinate along the in-plane unit vector that connects ($\sigma_1$, $\sigma_2$, $\sigma_3$) with the closest point on the hydrostatic axis. The similarity angle $\theta$ measures the angle between the $\sigma_1$- and the $\rho$-axes.

Figure 4:
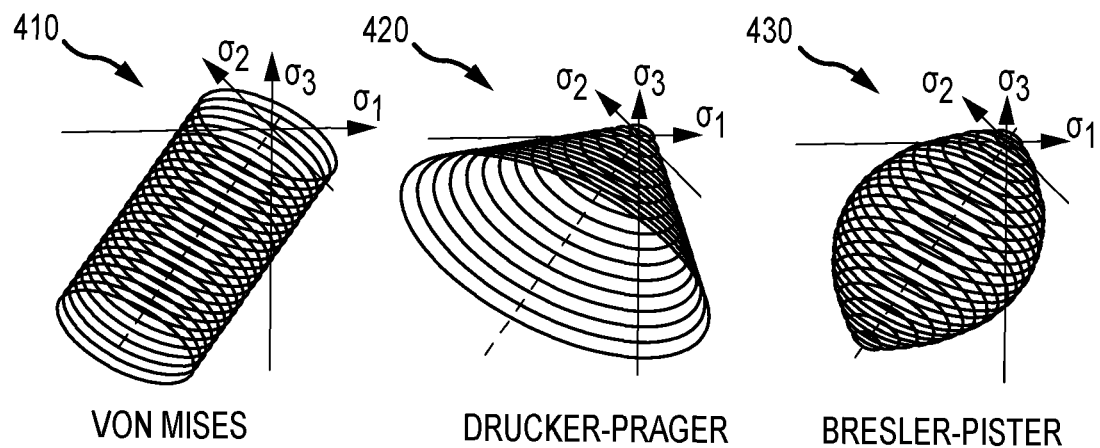
FIG. 4 illustrates graphically three differing failure criterion that may be useful in the optimization of 3D printed objects.

Failure surfaces separate stresses that cause failure from unproblematic ones and are best understood when working with the latter coordinates. For isotropic materials, the labels attached to the principal axis $\sigma_i$ are arbitrary. Hence, the intersection of the failure surface with a hydrostatic plane at $\xi$ has to be treefold rotationally symmetric. Failure surfaces are convex and smooth. Most common in graphics is the von Mises failure criterion, where the hydrostatic coordinate equals a factor times the compressive strength $\sigma_c$ of the material. Note that the failure criterion is independent of the other two coordinates. The resulting failure surface is, therefore, an infinite cylinder with axis equal to the hydrostatic axis as can be seen with the failure surfaces 410, 420, and 430 shown in FIG. 4. The von Mises failure criterion only considers the deviatoric stress, which results in a tube-shaped failure surface 410. The Drucker-Prager failure criterion also models the asymmetry in tension and compression and creates a cone-like failure surface 420. The inventors chose to use the Bresler-Pister failure criterion, which also considers the biaxial compressive strength and creates a closed failure surface 430 with circular cross sections.

The von Mises failure criterion, however, does not include the tensile strength. Seeking a criterion that accounts for differences in compressive and tensile strength, the Drucker-Prager criterion is a candidate where constant coefficients A($\sigma_c$, $\sigma_t$) that depend on the compressive and tensile strength, control the slope and origin of the open cone with axis equal to the hydrostatic axis. However, while it accounts for the asymmetry in strength, the Drucker-Prager criterion is ill-suited for optimization as it allows compressive stresses to grow infinitely high (cone-like shape that is open on one side). A criterion that better approximates the behavior of the build material of some 3D printers (such as those using binder jetting) and avoids the unboundness of compressive stresses is the Bresler-Pister criterion:

$$f(\xi, \rho) =$$

$$\sqrt{J_2} - A - BI_1 - CI_1^2 = 0 = \left(\frac{1}{\sqrt{2}}\right) * \rho - A - \sqrt{3} * B * x_i - 3 * C * x_i^2,$$

in($x_i$, $\rho$, $\theta$) – coordinates.

It implements a parabolic dependence of $\rho$ on $\xi$ and, as a three-parameter model, also includes the biaxial compressive strength $\sigma_b$ of the material to determine the failure surface, next to the compressive strength $\sigma_c$ and the tensile strength $\sigma_t$.

One goal of optimizing a 3D printed object is to define an objective to minimize a structure's potential of failure. However, while failure criteria allow us to evaluate if the Cauchy stress σ lies on the failure surface, they do not provide a means to measure the distance to failure. To turn the Bresler-Pister criterion into a distance measure, all strength parameters may be multiplied with the same distance-to-failure factor s when evaluating the constant coefficients:

$$A(s\sigma_t, s\sigma_c, s\sigma_b)$$

$$B(s\sigma_t, s\sigma_c, s\sigma_b)$$

$$C(s\sigma_t, s\sigma_c, s\sigma_b)$$

$$A(s\sigma_t, s\sigma_c, s\sigma_b) = s * A(\sigma_t, \sigma_c, \sigma_b)$$

$$B(s\sigma_t, s\sigma_c, s\sigma_b) = B(\sigma_t, \sigma_c, \sigma_b)$$

$$C(s\sigma_t, s\sigma_c, s\sigma_b) = \left(\frac{1}{s}\right) * C(\sigma_t, \sigma_c, \sigma_b)$$

$$\sqrt{J_2} = s * A + BI_1 + \left(\frac{1}{s}\right) * (CI_1)^2$$

$$As^2 + (B * I_1 - \sqrt{2} * x + C * (I_1)^2 = 0$$

solving the failure surface equation for the distance-to-failure:

$$s(\sigma) = \frac{\sqrt{J_2} - BI_1 + \sqrt{(B^2 - 4\,AC)I_1^2 - 2BI_1\sqrt{J_2} + J_2}}{2A}$$

Figure 5:
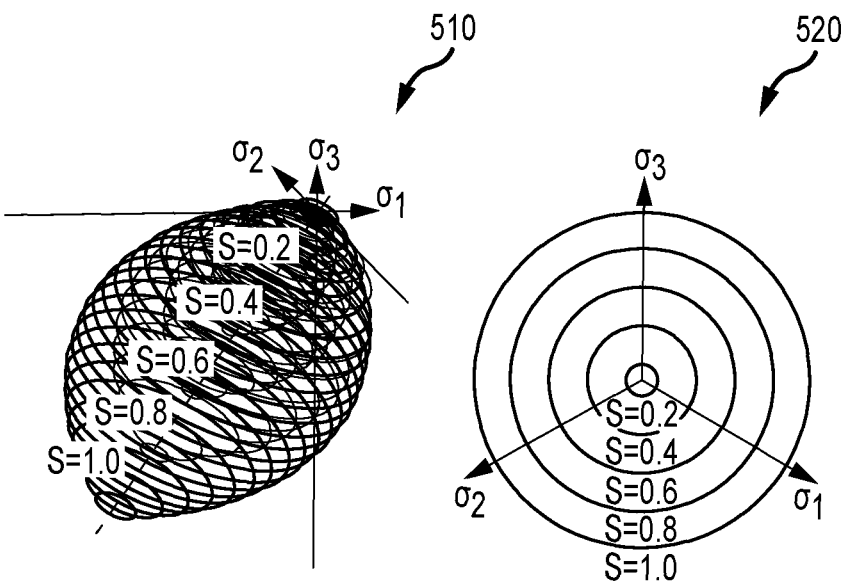
FIG. 5 provides a graph of a Bresler-Pister failure surface and a graph of distance-to-failure for stresses.

With regard to failure potential, one can define a distance-to-failure s that measures the potential of a given stress state to introduce failure. This definition may be based on a scaling of the strength parameters of the material, shown with graph 510 in FIG. 5 with failure surface, s(σ)=1; failure, s(σ)>1; and no failure, s(σ)<1. The isosurfaces for different values of s form smaller versions of the failure surface. Looking at a cross section along the middle axis of the failure surface as shown in graph 520 of FIG. 5 one can observe the distance-to-failure for all stresses with the same mean stress value.

As illustrated with graph 520, the distance-to-failure has the desired properties, measuring the potential of failure. It returns zero if the Cauchy stress is zero, and it takes on increasing values in the interval [0, 1] the closer σ is to the failure surface. For stresses on the failure surface, s(σ) evaluates to 1. If the Cauchy stress grows beyond failure, s monotonically increases with the distance of σ to the failure surface. One design goal is, therefore, to ensure that the distance-to-failure s is below 1 at any location X in the structure at rest and under any load $1^k$. More formally, structure is sought where the maximum failure potential s is minimized across all loads $1^k$. Approximating this minimization of the maximum with a sum over the exponentiated distance-to-failure and integrating over the domain $\Omega_s$ of the structure, the objective is formalized as:

$$h_{fail} = \int_{\Omega_s} \sum_k [s(X, 1^k)]^\gamma dv$$

Where the exponent γ ensures that large values of the distance-to-failure are penalized more. The inventors used γ=8 in all their demonstrations.

The inventors also aimed to control mass distribution as part of their optimization of 3D printed structures. Counterbalancing the failure objective, it was desirable to reduce the weight of the structure as much as possible while keeping it structurally sound. To minimize the weight, the inventors added an additional objective:

$$h_{weight} = V(\Omega_s)$$

where V is the volume of the structure, omitting the density of the material.

A user of the structural optimization tool may further be interested in controlling the center of mass c of the structure. This could help to make 3D printed objects or structures stably stand or, if fixed to the ground or a wall, reduce stresses close to their mounting locations. Representing the line that intersects the center of the support polygon by a parametric equation a(t)=a+tb, the squared distance of the center of mass c can be minimized to this line:

$$h_{CoM} = \frac{1}{2}\|(a - c(\Omega_s)) - ((a - c(\Omega_s)) \cdot b)b\|^2$$

At this point in the description, it may be useful to discuss formulating a worst-case optimization. For the structural optimization approach described herein, the free force parameters $p^k$ of any load $l^k(p)$ are first identified that maximize the potential of failure (see worst-case loads stage 214 of FIG. 2). An objective g is introduced that includes the structural objective $h_{fail}$, and the optimization problem is solved as:

$$\max_p \sum g^k(p, x^k(l^k(p))) \text{ s.t. } f(x^k(l^k(p))) = 0 \forall k$$

where static equilibrium is enforced which balances internal and external forces, f=0, for all the load cases (see simulation stage 212 in FIG. 2).

Then, on top of this optimization, a worst-case optimization is created (see the design optimization stage 216 of FIG. 2) that improves the structure of an object while maintaining this set of worst-case loads. Representing the boundary that separates solid from void space with a level set function φ, the aim is to minimize the overall objective:

$$h = w_{fail}h_{fail} + w_{weight}h_{weight} + w_{CoM}h_{CoM}$$

by evolving the level set of function φ. After including all the dependencies and the constraints for the static equilibrium and the first-order optimality of the worst-case loads, $\nabla_p g^k = g^k = 0$, the optimization problem is generated as:

$$\min_\phi h(\phi, \ldots, x^k(\phi, l^k p^k(\phi))), \ldots)$$

s.t. $g^k(\phi, p^k(\phi), x^k(\phi, l^k(p^k(\phi)))) = 0 \forall k$ $f(\phi, l^k(p^k(\phi)), x^k(\phi, l^k(p^k(\phi)))) = 0 \forall k$ The above formulation of worst-case optimization is relatively notation-heavy such that it may be useful to provide a more high-level overview over the nesting to further explain how the inventors' techniques work and can readily be implemented. The following provides more detail on how one can nest a forward simulation, a worst-case optimization, and a design optimization with first-optimality constraints to unify these three problems in a unified optimization problem.

Turning first to simulation as part of the unified optimization, given a load l, a simulation objective is formulated by subtracting the work performed with l from the internal energy E:

$$f_{sim}(x) = E(X,x) - l^T(x - X)$$

where X and x are the undeformed and deformed configurations, respectively

To compute a static equilibrium x, the gradient of the objective $$g_{sim}(x) = \frac{\partial E(X, x)}{\partial x} - l^T$$

to zero. The equilibrium is stable if the Hessian $$H_{sim}(x) = \frac{\partial^2 E(X, x)}{\partial x^2}$$

is positive definite.

For the worst-case optimization, the uncertainty in a load case l is parameterized with parameters p. This is done with the aim to identify the parameters that lead to the highest potential of failure $$f_{fail}(p) = \max_{X \in \Omega} s(X, x(l(p)))$$

where the deformed configuration x implicitly depends on the parameterized load l(p) due to the static equilibrium constraint $$\max_p f_{fail}(p, x(l(p))) \text{ s.t. } g_{sim}(p, x(l(p))) = 0$$

To solve this first-order constrained optimization problem, the constraints are treated implicitly by simulating to static equilibrium whenever the objective or objective gradient is evaluated $$\frac{df_{fail}(p, x(l(p)))}{dp} = \frac{\partial f_{fail}(p, x)}{\partial p} + \frac{\partial f_{fail}(p, x)}{\partial x}\frac{dx(l(p))}{dp}$$

where the Jacobian of the deformed configuration is computed with regard to the parameters with the implicit function theorem $$\frac{dx(l(p))}{dp} = -H_{sim}^{-1}(x)\frac{\partial g_{sim}(l, x)}{\partial l}\frac{\partial l(p)}{\partial p}$$

For increased efficiency, the adjoint system is solved as $$H_{sim}(x)\lambda = -\left(\frac{\partial f_{fail}(p, x)}{\partial x}\right)^T$$

instead, forming the gradient as follows $$H_{sim}(x)\lambda = -\left(\frac{\partial f_{fail}(p, x)}{\partial x}\right)^T$$

With regard to design optimization, the inventors aimed at changing the domain $\Omega$ with a discretized level set function $\phi$ such that the failure potential $$g_{fail}(p) = \frac{\partial f_{fail}(p, x)}{\partial p} + \lambda^T \frac{\partial g_{sim}(l, x)}{\partial l} \frac{\partial l(p)}{\partial p}$$

for the identified worst-case load l(p), and the weight $$f_{weight}(\phi) = V(\Omega(\phi))$$

are minimized, omitting the density of the material.

Optionally, the center of mass can also be placed by minimizing the distance to a line through the support polygon $$f_{CoM}(\phi) = \frac{1}{2}\|(d(\phi) \cdot n)n - d(\phi)\|^2 \text{ with } d(\phi) = c(\Omega_s(\phi)) - \bar{c}$$

resulting in an overall design objective $$f_{design}(\phi) = w_{fail} f_{fail}(\phi) + w_{weight} f_{weight}(\phi) + w_{CoM} f_{CoM}(\phi).$$

To formulate a unified, continuous optimization, the design, worst-case, and equilibrium problems are nested with two first-order constraints $$\min_{\phi} f_{design}(\phi, x(\phi, l(p(\phi))))$$
$$\text{s.t. } g_{fail}(\phi, p(\phi), x(\phi, l(p(\phi)))) = 0$$
$$g_{sim}(\phi, p(\phi), x(\phi, l(p(\phi)))) = 0.$$

To compute the gradient $$\frac{df_{design}(\phi, x(\phi, l(p(\phi))))}{d\phi},$$

the chain rule is applied $$\frac{df_{design}(\phi, x)}{\partial \phi} + \frac{\partial f_{fail}(\phi, x)}{\partial x} \frac{dx(\phi, l(p(\phi)))}{d\phi}$$

and we then apply the implicit function theorem to both first-order constraints:

$$\begin{bmatrix} H_{fail}(\phi, p, x) & \frac{\partial g_{fail}(\phi, p, x)}{\partial x} \\ \frac{\partial g_{sim}(\phi, l, x)}{\partial l} \frac{dl(p)}{\partial p} & H_{sim}(\phi, l, x) \end{bmatrix} \begin{bmatrix} \frac{dp(\phi)}{d\phi} \\ \frac{dx(\phi, l(p(\phi)))}{d\phi} \end{bmatrix} =$$

$$\begin{bmatrix} -\frac{\partial g_{fail}(\phi, p, x)}{\partial \phi} \\ -\frac{\partial g_{sim}(\phi, p, x)}{\partial \phi} \end{bmatrix}.$$

With regard to objectives, the max-operator can be approximated in the failure objective $f_{fail}$ with an exponentiation of the scale factor $$\int_{\Omega} [s(x, x(l(p)))]^\gamma dV$$

If several load cases $l^k(p^k)$ are present, it may be preferable to identify the maximal scale factor among loads $l^k$, and across the entire domain $\Omega$ $$f_{fail}(p) = \max_k \max_{X \in \Omega} s(X, x(l^k(p^k))),$$

approximating the objective with $$\sum_k \int_{\Omega} [s(x, x(l(p)))]^\gamma dV.$$

If several load cases are present, it may be useful to forward simulate for every individual load case $l^k(p^k)$ separately, computing gradients by summing up terms.

At this point in the discussion, it may be useful to provide a more detailed description of the simulation portion of the structural optimization (or stage 212 of FIG. 2). In the optimization process, the structures undergo only small deformations, and the formulation is based on the infinitesimal strain theory. The volume enclosed by the input 3D model is discretized with isoparametric, tetrahedral elements, and the undeformed nodes $X_i$ and corresponding level set values $\phi_i$ are interpolated within the elements with standard linear shape functions $N_i$:

$$X(\xi) = \sum_{i=1}^{4} X_i N_i(\xi) \text{ and } \phi(\xi) = \sum_{i=1}^{4} \phi_i N_i(\xi)$$

To interpolate deformed nodes $x_i$, the inventors differentiate between elements cut by the level set ($\phi_i$ have different signs) and elements that are either part of the solid ($\phi_i<0$) or void space ($\phi_i>0$). For uncut elements, standard linear interpolation may be used. Cut elements, however, require a special treatment due to the $C^0$-continuity at the interface, separating solid from void space. To avoid expensive remeshing, respective elements can be enriched with:

$$X(\xi) = \sum_{i=1}^{4} x_i N_i(\xi) + \sum_{i=1}^{4} \hat{x}_i \hat{N}_i(\xi) \text{ with } \hat{N}_i(\xi) = N_i(\xi)\psi(\xi)$$

interpolating additional degrees of freedom $\hat{x}_i$ with shape functions $\hat{N}_i(\xi)$. To represent the weak discontinuity at the interface, the ridge function may be used as follows:

$$\psi(\xi) = \sum_{i=1}^{4} |\phi_i| N_i(\xi) - \left| \sum_{i=1}^{4} \phi_i N_i(\xi) \right|$$

Note that the deformation gradient $$F(\xi) = \frac{\partial x(\xi)}{\partial \xi} \left( \frac{\partial X(\xi)}{\partial \xi} \right)^{-1}$$

is not constant for enriched elements, and a numerical integration of the linear strain energy density is required as follows:

$$\psi(\xi) = \mu \varepsilon(\xi) : \varepsilon(\xi) + \frac{\lambda}{2} tr^2(\varepsilon(\xi))$$

where $\varepsilon$ is the Cauchy strain and $\mu$ and $\lambda$ Lamé constants.

Figure 6:
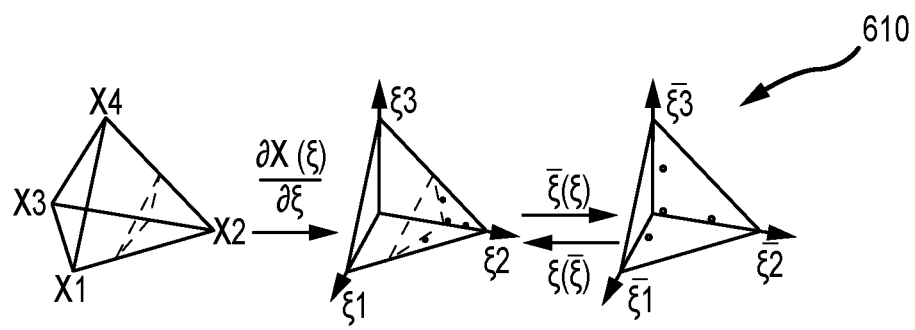
FIG. 6 is a graphical representation of a process of computation of edge-interface intersections for an enriched element.

Gauss quadrature assumes a polynomial approximation. Due to the weak continuity at the interface, it may be difficult to apply a quadrature rule to a cut element directly. Common protocol can instead be followed and cut elements decomposed into sub-elements that conform to the interface. To this end, the edge-interface intersections for an enriched element can be computed as is illustrated with the graphic representation 610 of FIG. 6 of this computation, defining mapping $\xi(\bar{\xi})$ between sub-elemental $\bar{\xi}$ and element coordinates $\xi$. As shown, to integrate the strain energy density $\psi$ over an element (left part of representation 610), the isoparametric domain (shown in the middle of representation 610) can be used for numerical integration, mapping quadrature points $\bar{\xi}_k$ from sub-elemental to elemental coordinates $\xi(\bar{\xi}_k)$ (as shown at the right portion of representation 610).

Integrating in the isoparametric domain of the enriched element (middle portion of representation 610 of FIG. 6), the elemental energy density is evaluated as:

$$W_\varepsilon = \sum_s \int \varepsilon_s \psi(\xi) \det\left|\frac{\partial X(\xi)}{\partial \xi}\right| d\xi$$

$$\approx \frac{1}{6} \sum_s \sum_k w_k \psi(\xi(\bar{\xi}_k)) \det\left[\frac{\partial X(\xi(\bar{\xi}_k))}{\partial \xi}\right]$$

where the weights $w_k$ and quadrature points $\bar{\xi}_k$ implement a standard rule over the unit cube in sub-element coordinates. To account for the change of variables from world to elemental coordinate, the inventors multiplied with the determinant of the Jacobian of the mapping $X(\xi)$. With the scale factor, it can be taken into account that a unit tetrahedron covers a sixth of the unit cube. Uncut elements are analytically integrated: $W_e = V_e \psi_e$, where $V_e$ denotes the rest-volume of the element and $\psi_e$ the constant strain energy density for deformation gradient $F_e$. At integration points in the void space, an ersatz material can be used with a small Young's modulus to avoid singularities (e.g., one may use $10^{-4}$ of the original stiffness or the like).

Due to the use of linear elasticity, the total energy with per-vertex loads l:

$$f_{sim} = \sum_e W_e(\tilde{x}) - 1^T(x - X)$$

$$\tilde{x} = [x, \hat{x}]$$

This is the quadratic in the unknown deformed configuration $x \in \mathbb{R}^{3n}$ and additional degrees of freedom $\hat{x} \in \mathbb{R}^{3m}$ where $m<n$ is the number of nodes adjacent to an enriched element. Hence, the unknown deformed configuration can be solved for by forming a sparse linear system. Note, "x" is used here to refer to the combination of standard and additional degrees of freedom as deformed configuration "x."

Rubber and foam is often used to shim material between a mounting system and a structure. Hence, Direchlet conditions, while straight-forward to enforce, lead to unrealistically high stresses close to mounting locations. To "soften" Dirichlet conditions, undeformed and deformed nodes can be interpolated within triangles on the surface with linear shape functions:

$$X(\zeta) = \sum_{i=1}^{3} X_i N_i(\zeta) \text{ and } x(\zeta) = \sum_{i=1}^{3} x_i N_i(\zeta) + \sum_{i=1}^{3} \hat{x}_i \hat{N}_i(\zeta)$$

minimizing the weighted distance:

$$d(\zeta) = (x - X)^T D(x - X) \text{ with } D(\zeta) = w_\perp nn^T + w_\parallel (I - nn^T)$$

between undeformed and deformed triangles fully or partially (cut by the level set function) in contact with the mounting system. Using a standard quadrature rule, one can integrate numerically over the unit square:

$$W_t = \sum_s \int \mathcal{J}_s d(\zeta) \det\left|\frac{\partial X(\zeta)}{\partial \zeta}\right| d\zeta$$

$$\approx \frac{1}{2} \sum_s \sum_k w_k d(\zeta(\bar{\zeta}_k)) \det\left[\frac{\partial X(\zeta(\bar{\zeta}_k))}{\partial \zeta}\right]$$

multiplying with a factor to account for the isoparameteric triangle covering half of the unit square. Analogously to the tetrahedral case, triangles cut by the level set can be split into sub-triangles conforming to the interface, mapping between domains accordingly. With weights $w_\perp$ and $w_\parallel$, resistance is controlled in normal $n(\zeta)$ and tangential directions (sliding).

Integration points may be skipped in the void space, ignoring triangles that are in contact with the mounting system but completely void. In simulations the term $\Sigma_t W_t$ was added to the energy $f_{sim}$.

Turning now to worst-case load (or stage 214 of the optimization 200 of FIG. 2), when optimizing the strength-to-weight ratio of structures, load cases have a significant influence on the performance of the result. While an optimized structure is stable under specific loads, perturbing loads by small amounts can lead to failure. Analyzing several optimized structures, it can be observed that this is the rule rather than the exception. With the worst-case formulation, this challenge is addressed including identifying the loads that lead to the highest failure potential $f_{fail}$.

In the most general case, the pressure or traction distribution on a structure's surface or its entire volume is considered known. Bounding the maximum pressure, the structure could be optimized to withstand general load cases. However, this scenario is overly conservative, and a large subset of worst-case forces could not be reproduced in practical applications. At smaller scales, an end-user might interact with printed parts in unpredictable ways, pressing and pulling on them. However, at larger scales, load cases are often well defined with uncertainties spanned by a clearly defined subspace.

Load types are commonly specified by a structural engineer and include wind and live loads. Architectural ornaments are often exposed (e.g., a statue of a gargoyle on a cathedral). While a structural engineer can provide input including an estimate of the maximum expected wind magnitude, the direction of the wind is largely unknown. Sculptures standing in a public park are often climbed on. Again, a structural engineer can provide input as to what the maximum weight of a person climbing on a given structure is, providing input including regions of expected contact. However, within these regions is largely unknown where a person would stand or hold onto the structure during climbing. With these challenges in mind, the following first discusses loads without uncertainties, namely self-weight and thermal loads. Then, the description will turn to formalizing the uncertainty in the wind and live loads, including discussions of an overall optimization to identify parameters p that lead to the highest potential of failure.

With regard to specifying load cases, due to the infiltrated build material being weak and heavy, self-weight or dead load is an important load case. If exposed to severe weather conditions all year round, the outside temperature can vary significantly. In proximity of mounting locations, very high or very low temperature can lead to high stresses, which further motivated the "softening" of Dirichlet conditions in the optimization.

Regarding self-weight, the gravity direction can be defined with a constant vector g of length equal to the gravitational constant, to provide the gravitation potential as:

$$G(\xi)=p(\xi)g^T[x(\xi)-X(\xi)]$$

Analogously to the internal energy, the gravitational potential can be numerically integrated over the elements volume:

$$G_e = \sum_s \int \varepsilon_s G(\xi) d\xi$$

$$\approx \frac{1}{6}\sum_s\sum_k w_k G(\xi(\bar{\xi}_k))\det\left[\frac{\partial X(\xi(\bar{\xi}_k))}{\partial \xi}\right]$$

setting the density at integration points in the void space to zero. To account for self-weight, $\Sigma_e G_e$ is added to the internal energy E. A common strategy to analyze the performance of structures under seismic loads is to apply forces in vertical and lateral directions, with magnitudes set to a fraction of the structure's weight. While seismic loads were not considered in some embodiments of the optimization and its demonstrations, this quasi-static approximation could be used to formulate a worst-case optimization, parameterizing the direction g and its norm in the above-described gravitation potential.

Regarding thermal loads, when a structure undergoes a change in temperature $\Delta T$, the overall volume change is proportional to the change in temperature $$\frac{\Delta V}{V} \alpha \Delta T.$$

Assuming a homogenous material and the temperature T not to vary across the structure, the volume change does not lead to internal stresses if unconstrained, motivating the use of an offset of the deformation gradient:

$$\hat{F}(\xi)=F(\xi)-\alpha\Delta TI$$

where $\alpha$ is the coefficient of thermal expansion of the build material. The relative change is subtracted from the deformation gradient, thus effectively changing the rest configuration of the structure.

For wind and live loads, there is uncertainty in the exact direction and location of applied loads. The subspace spanning these uncertainties can be formalized by parameterizing them. With regard to wind loads, architectural ornaments are commonly wall-mounted, and wind directions constrained to a hemisphere. To parameterize the direction of wind, two angles $\alpha$ and $\beta$ can be used (see wind load graphical representation 710 in FIG. 7) to define the unit-length direction as:

$$D(p_{wind})=[\sin(\alpha)\cos(\beta)\sin(\beta)\cos(\alpha)\cos(\beta)]^T$$

where the angle parameter is collected in a vector $p_{wind}$. To avoid singularities, the angles are constrained to ranges $\alpha \in [0,\pi]$ and $$\beta \in \left[-s_{wind}\frac{\pi}{2}, s_{wind}\frac{\pi}{2}\right]$$

with scale factor $s_{wind}<1$. Note that this parameterization can be easily extended to the full sphere using quaternions instead.

Figure 7:
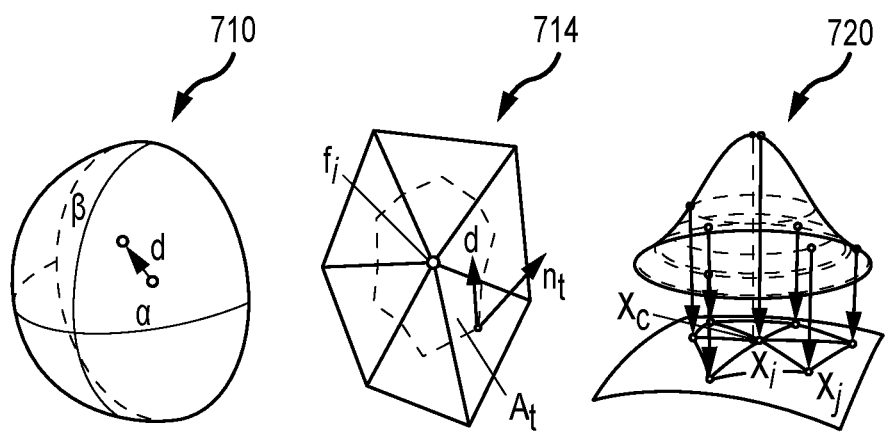
FIG. 7 provides wind load and live load graphical representations for use in performing the optimization of the present description.

Assuming the wind direction d to point in one direction in global coordinates, pressure $f_{wind}$ can be applied to all triangles exposed to the wind, scaled by the orthographically projected area weighted with the angle between negative normal n and wind direction d. Formally, each triangle t with $d \cdot n_t < 0$, adjacent to node i, contributes:

$$-fwind\frac{A_t}{3}[n_t \cdot d(p_{wind})]d(p_{wind})$$

to the force $f_i$ acting at the node i (see wind load graphical representation 714 in FIG. 7).

Turning to live loads, live loads model can be used to model a number of loads such as a person sitting on a bench, a person leaning against a column, and a person climbing a sculpture. They are localized and act in a set of disconnected regions on the surface of a structure. While there is uncertainty in the exact location of a live load, its distribution is often known or can be approximated. Therefore, the center $X_c$ of a force distribution can be used as parameter $p_{live}$, assuming the direction and overall strength $f_{live}$ of the force distribution to be known. Using radial basis functions to model the distribution, the contribution to the force $f_i$ acting at node i is:

$$\frac{w(X_i X_c)}{\sum_j w(X_j X_c)} f_{live}$$

with normalizing over all nodes with non-zero weight. For the weights, a Gaussian is used that is centered at $X_c$ with standard deviation $h_c$: $w(X,X_c)=e^{-h_c^{-2}\|X-X_c\|^2}$. See live load graphical representation 720 of FIG. 7. However, custom distributions can easily be incorporated if desired.

Live loads often have a limited area where they can act, a fact that is taken into consideration when computing the worst-case load. Particularly, a region is defined where the load can act, and the total force $f_{live}$ is distributed only to points within that region. Additionally, it is useful to keep the center $X_c$ close to this region to avoid forces that are too localized. Introducing the regularization:

$$R(P_{live}) = \frac{1}{\sum_j w(X_j, X_c)} \sum_i w(X_i, X_c)\|X_i - X_c\|^2$$

favoring centers that remain in close proximity to specified regions.

As discussed above, the optimization of an object or structure for 3D printing involves optimizing for the worst-case loads. Given a combination of unparameterized and parameterized loads, the parameters $p^k$ are identified for each load case k that lead to the highest failure potential. This worst-case load is computed by maximizing the objective:

$$g^k(p, \tilde{x}^k(l^k(p))) = h_{fail}(\tilde{x}^k(l^k(p))) - R^k(p)$$

which includes the failure objective $h_{fail}$ for a single deformation and a regularization term. This optimization implicitly assumes that structure is always in static equilibrium for the given load $l^k(p)$, and this assumption is included as a constraint in the optimization:

$$\max_p g^k(p, \tilde{x}^k(l^k(p))) \text{ s.t. } f(\tilde{x}^k(p)) = 0$$

Newton's method with a backtracking line search approach is used to solve this optimization problem. While there are generally few parameters to optimize, the shape of the objective can be complex and contain local minima. To alleviate this problem, a sampling is created of N=10 initial points, and the best point is chosen as the starting position for optimization.

At this point in the description, it may be useful to discuss design optimization (or stage 216 of optimization 200 of FIG. 2) in more detail. In the above discussion, the simulation model was introduced along with a useful approach to determining the worst-case loading conditions. Now, an optimization approach can be built upon these two components that modifies the geometry of an object to minimize the objective while dynamically adapting the worst-case loading condition. This may involve first evolving the level set.

So far in this discussion, there has been an assumption that the level set function $\phi(X)$ is static. Now, the discussion will include evolving a time-dependent level set function $\phi(X, t)$ to change the geometry during the optimization. The discretization has several advantages over alternative approaches (such as offset surfaces) including its support of topological changes. Voxelizations support topological changes but require a high resolution and activation variables to accurately optimize a behavior. In contrast, the inventors' discretization represents the interface between the build and the ersatz material exactly without requiring a high resolution. The level set is evolved based on the level set advection equation, which describes the change of the level set based on a velocity field $v(X, t)$:

$$\frac{\partial \phi(X, t)}{\partial t} = -\nabla_x \phi(X, t) v(X, t)$$

Since a velocity field is generally used that can be decomposed as $v(X, t)=v(X, t)n(X, t)$, where $v(X, t)$ is the magnitude of the velocity, the direction is given by the normal of the level set isosurface $$n(X, t) = \frac{\nabla_x \phi(X, t)}{|\nabla_x \phi(X, t)|},$$

and $|\nabla_x \phi(X,t)|$ due to the signed distance field property, the equation can be simplified to:

$$\frac{\partial \phi(X, t)}{\partial t} = -v(X, t)$$

Now, $v(X, t)$ can be chosen in a way that minimizes the objective function $g(\phi(X,t))$. One obvious choice is the gradient $v(x, t)=\nabla_\phi g(\phi(x,t))$. However, the gradient is only non-zero for vertices close to the level set interface. Using this gradient directly for the update would impede the convergence when the interface moves between elements and also would destroy the signed distance field property of the level set. A common approach to avoid this is to propagate the gradient throughout the whole volume. If we denote the neighborhood of the interface where the derivative is non-zero by $N(\partial\Omega_s)$, the propagated gradient can be defined as a scalar field $u(x, t)$:

$$u(X, t) = \begin{cases} \nabla_\phi g(\phi(X, t)) & \text{if } X \in N(\partial\Omega_s) \\ \nabla_\phi g(\phi(X', t)), & \text{where} \\ \forall Y \in N(\partial\Omega_s): \|X - X'\| \leq \|X - Y\| & \text{otherwise} \end{cases}$$

In practical terms, the Dijkstra propagation is used to distribute the gradient to all nodes that store the level set values. Collecting all discrete level set values $\phi \in \mathbb{R}^n$ at nodes of the tetrahedral mesh, a simple Euler scheme can be used to propagate the front:

$$\phi_{t+1} = \phi_t - \alpha \frac{u(X, t)}{\max_i |u(X_i, t)|} \beta$$

where the propagated gradient is normalized with the element of maximum absolute value, the step is scaled with $\beta=0.1$, and the standard backtracking line search is performed to find the optimal $\alpha$, starting at $\alpha=1$. The signed distance field property of the level set is not exactly preserved during he advection. The level set is periodically re-initialized to a signed distance function, using Dijkstra propagation to create the field starting from the current level set interface. While this approach was found to be sufficient for the currently described optimization, more sophisticated approaches could be used to improve the reinitialization.

Throughout the optimization of the level set, the worst-case loads are updated, always starting the computation from the force parameters from the last step. While this keeps the load case at a local minimum, it does not guarantee that this load case will always be the worst-case load. In fact, it is likely that, since the computation involves optimizing for the stability under this specific load case, local minima for other parameters will appear. Therefore, a reinitialization of the worst-case load case is run after every iteration of the level set, and this load case is included as an additional load case if its parameters are significantly different from the existing worst-case loads.

With regard to computing the gradient, the optimization implicitly includes the static equilibrium of the simulation and the worst-case loads. While it ensures that for every update these two conditions are satisfied, they also have to be included in the gradient of the objective function through the implicit function theorem. Specifically, when computing the gradient of the objective, the effect of the change of the level set on the deformed state of the object is included, which is implicitly defined by the equilibrium condition and the worst-case load condition.

The inventors tested their optimization processes by creating output print models from input 3D models and printing out optimized 3D printed objects. Particularly, the inventors optimized the strength-to-weight ratio of four models (see printed objects 110, 120, and 130 of FIG. 1 and also a Chinese dragon structure (not shown)). The optimization was tailored for 3D printing using binder jetting technology, and the output print files (defining optimized structures) created with the structural optimization tool were used to print three objects 110, 120, 130.

The elephant model 110 is subjected to self-weight. For the full model, the center of mass projects outside the support polygon, and the model would tip. The plot of the distance-to-failure showed that if the model were attached to the ground, the self-weight would cause it to break at the leg. A model with constant thickness and a volume equivalent to the optimized result would be able to withstand its own weight without breaking but would also not be able to stand without tipping. The optimized model, though, does neither tip nor break and can be successfully fabricated and left standing.

The stool model 120 is subjected to a person sitting in an arbitrary spot on the top of the stool (e.g., top right region in FIG. 1). The optimization by the tool identifies the worst-case loads that create the largest momentum (downward live loads where person is sitting) and then strategically places material at the base, especially in regions of high tensile stress and in the center of the stool (e.g., these layers are not necessarily hollow and/or have thicker outer walls). Small struts are also created in the seat of the stool 120. For a specific worst-case load, the optimized model is stable, while a structure with the same volume but constant wall thickness would break.

The gargoyle model 130 is constrained at its base (where it would be mounted to a wall) and subjected to worst-case wind loads (e.g., striking the top, bottom, or sides of the cantilevered structure). The optimization adds material to the connection between the gargoyle 130 and the base, where the wind induces strongest momentum. Looking at a specific wind load, the resulting structure is stable, while a structure with the same volume but constant wall thickness would break.

The models were printed on a Voxeljet VX1000. The VX1000 has a build volume of 1.0 by 0.6 by 0.5 m, a resolution of 600 dpi in the x and y directions, and a layer thickness of 300 micrometers in the z direction. Silica sand was used together with Voxeljet's standard binder to build models with remarkable detail. The remaining sand can be blown off and recycled. The stability and general durability of printouts can be increased by infiltrating them with an epoxy resin. The resin moves into the void parts between the sand granules and binder and increases the strength of the prints significantly. The best infiltration is achieved by placing the print in the resin and creating a vacuum, e.g., using a vacuum chamber. The inventors used epoxy infiltration on the two prints that were designed for significant loads (i.e., the gargoyle object 130 and the stool structure 120).

To identify material and strength parameters, the inventors performed standard cylinder tests. In a first test, a cylinder was compressed along its axis, identifying the Young's modulus E and compressive strength $\sigma_c = f_t/A$ of the infiltrated build material where $f_t$ is the failure load and $A=\pi r^2$ the cross-sectional area. To characterize the tensile strength, split-cylinder tests were performed with the same testing machine, laying down cylinders. Due to the weakness of the material under tension, the cylinder breaks due to tensile stresses. It was estimated that the tensile strength $\sigma_t = f_t/\pi r h$ from the failure load $f_t$, and the radius r and the height h of the cylinder. To probe the biaxial compressive strength of the material, advance testing machines are required. The inventors followed common practice, setting $\sigma_b$ to 1.2 times the uniaxial compressive strength $\sigma_c$. To estimate the Poisson's ratio, the rule of mixtures was applied:

$$v = t v_{epoxy} + (1-t) v_{sand} \text{ with } t = \frac{V_{epoxy}}{V_{epoxy} + V_{sand}}$$

where the volume fractions $V_{epoxy}$ and $V_{sand}$ are estimated from the weight difference of samples before and after infiltration.

In the optimizations, the following values were used: E=0.66 GPa, $v$=0.15, $\rho$=1265 kg/m$^3$, $\sigma_t$=0.8 MPa, $\sigma_c$=5.2 MPa, and $\sigma_b$=6.2 MPa for the uninfiltrated material, and E=2.43 GPa, $v$=0.15, $\rho$=1426 kg/m$^3$, $\sigma_t$=20. MPa, $\sigma_c$=16.3 MPa, and $\sigma_b$=20.0 MPa for the epoxy-infiltrated material. To ensure structural integrity, the strength parameters were multiplied by an additional safety factor of 0.5.

For the optimization of the elephant 110, the mass distribution objective was shown on the elephant model which stands on one foot. Self-weight was considered only, aiming for a decorative object that does not need to be infiltrated with epoxy and, therefore, does not need any post-printing treatment. FIG. 1 shows generally the geometry of the model as well as the fabricated result 110. For the optimization of the stool 120, it was realized that furniture, especially chairs and stools, have to withstand people sitting on them in various ways. To demonstrate usefulness of the structural optimization tool, a load of 900 N with a spread of $h_f$=0.1 m was applied. During optimization, the tool identified five worst-case loads, all on the side of the stool that induces a momentum that leads to the largest tensile stress in the base. For the optimization of the gargoyle statue 130, it was recognized that such statues are typical decorative elements of old cathedrals that experience large momenta due to its own weight and strong winds. The structural optimization tool was applied to an input 3D model defining a gargoyle statue and, besides gravity, the tool also considered worst-case wind loads with a wind pressure of $f_w$=2.5 kPa. The test showed that the tool identified worst-case wind directions were two wind loads that increased the load in the direction of gravity and one wind load with a direction that pushed the statue upwards, targeting weak spots at the feet of the gargoyle (near the connection areas to the mounting base). The optimization tool successfully strengthened the model against these loads by thickening parts of the base and the connection to the figure.

Although the invention has been described and illustrated with a certain degree of particularity, the particular implementations described in the present disclosure has been as examples, and numerous changes in the combination and arrangement of parts can be resorted to by those skilled in the art without departing from the spirit and scope of the invention, as claimed.

Despite there being a relatively large body of work on structural and topology optimization techniques, the optimization described herein models the asymmetry in compressive and tensile strengths in a new and unique manner. The optimization techniques also break new ground by addressing worst-case loads in a novel way that is tailored to meet the needs of a structural engineer. The structural optimization tool supports parametric versions of several types of loads that had not previously been explored. Additionally, the tool was designed without making the common assumption that the uncertainty is restricted to a small neighborhood around the specified conditions. For concrete-like materials, the ratio between tensile and compressive strength can be as low as 0.05. If a symmetric stress objective is minimized, a large fraction of the material budget is wasted on reducing compressive stresses that are not problematic, and this is a very important advantage of the described structural optimization tool. Further, the tool uses worst-case optimization to avoid the need for a post-optimization sensitivity analysis. Worst-case loads are estimated that maximize stresses continuously such that use of the new tool avoids a tedious post-optimization analysis and re-optimizations.

From a review of the above description and attached figures, it will be clear that the inventors have provided at least the following contributions to the technical field of 3D printing: (a) a stress objective that accounts for the asymmetry in tensile and compressive strength of concrete-like build materials; (b) parameterized forces and a worst-case loads optimization, identifying loads that lead to highest stresses within a structure; (c) a strategy to unify a worst-case loads with a strength-to-weight optimization by nesting first-order optimality constraints; and (d) a technique for the combined optimization of mechanical and mass properties.

We claim:

1. A three-dimensional (3D) printer system, comprising:
a 3D printer adapted for printing 3D objects using a build material; and
an optimization system with memory storing a 3D model of an object and a processor executing software code to provide functions of a structural optimization tool,
wherein the structural optimization tool takes as input the 3D model of the object, strength and material parameters for the build material, and a set of loads,
wherein the structural optimization tool processes the input to first generate a set of worst-case loads for the 3D model of the object from the set of loads and to second generate an output print file defining a plurality of wall thicknesses for an optimized version of the 3D model of the object with a hollowed out interior that is adapted to withstand the set of worst-case loads, the plurality of wall thicknesses each being defined excluding material associated with providing struts in the hollowed out interior,
wherein the 3D printer is operable to print a 3D object modeling the optimized version of the 3D model of the object using the output print file, and
wherein the set of loads includes a set of unparameterized loads including thermal loads and a set of parameterized loads including wind loads.

2. The system of claim 1, wherein the 3D printer performs the printing using binder jetting.

3. The system of claim 1, wherein the structural optimization tool generates the optimized version of the 3D model of the object by moving material from regions of lower stresses to regions of higher stresses to define the plurality of wall thicknesses, and wherein the regions of higher stresses are associated with locations of stresses created by the set of worst-case loads.

4. The system of claim 3, wherein the optimized version of the 3D model of the object is formed by the structural optimization tool to use a predefined volume of the build material and to optimize a strength-to-weight ratio of the printed 3D object by controlling mass distribution.

5. The system of claim 4, wherein the structural optimization tool optimizes the strength-to-weight ratio by unifying the set of worst-case loads with a strength-to-weight optimization to provide a single continuous optimization by nesting first-order optimality constraints.

6. The system of claim 1, wherein the plurality of wall thicknesses are chosen by the structural optimization tool to satisfy a failure criterion that accounts for differences in compressive and tensile strengths of the printed 3D object.

7. The system of claim 6, wherein the failure criterion is based on the Bresler-Pister criterion.

8. The system of claim 1, wherein the structural optimization tool hollows an interior portion of the 3D model of the object to form the hollowed out interior and inserts one or more structural members into the hollowed out interior as part of generating the optimized version of the 3D model of the object.

9. The system of claim 1, wherein the set of unparameterized loads further includes self-weight loads.

10. The system of claim 1, wherein the set of parameterized loads further includes live loads.

11. A 3D printer system, comprising:
memory storing a 3D model of an object that defines an exterior geometry of the object; and
an optimization tool performing the following steps:
defining material parameters for a build material;
defining loading conditions for the object; and
generating an output printer file for a 3D printer using the build material, wherein the generating includes optimizing an internal structure of the object while maintaining the exterior geometry and wherein the optimizing of the internal structure includes hollowing the object and defining two or more thicknesses for an outer wall while minimizing stresses and volume of the build material used to print the object and wherein the two or more thicknesses for the outer wall are in at least one single layer of the output printer file,
wherein the loading conditions include worst-case loads for the object, and
wherein asymmetric compressive and tensile strengths of the object are accounted for during the optimizing such that the maximum tensile stress in the object during the worst-case loads is less than a tensile strength of the object after printing with the build material by the 3D printer.

12. The system of claim 11, wherein the optimizing of the internal structures includes modifying connectivity of the internal structure, whereby a strength-to-weight ratio of the object is increased.

13. The system of claim 11, wherein the optimizing of the internal structure includes distributing a predefined material budget for printing the object with the 3D printer with the build material to reduce stresses caused by worst-case loads under the loading conditions.

14. The system of claim 11, further comprising a 3D printer that prints a 3D object using the output printer file, wherein the two or more wall thicknesses satisfy a failure criterion that accounts for differences in compressive and tensile strengths of the printed 3D object, and wherein the loading conditions include a set of unparameterized loads including at least one of self-weight loads and thermal loads and further include a set of parameterized loads including at least one of wind loads and live loads.

15. A system for printing 3D objects, comprising:
a device operable to print 3D objects; and
an optimization system with data storage storing a geometry of an object and a processor executing instructions to provide a structural optimization tool,
wherein the structural optimization tool takes as input the geometry of the object and load conditions,
wherein the structural optimization tool processes the input to first generate a set of worst-case loads for the object from the load conditions and to second generate an output print file defining an interior topology of the object for concurrently withstanding maximum compressive and tensile stresses generated by the set of worst-case loads, the interior topology defining a hollow out space in the object enclosed by a plurality of wall thicknesses each being defined excluding material associated with providing struts in the hollowed out space,
wherein the device operates to print a 3D object using the output print file, and
wherein the plurality of wall thicknesses is chosen by the structural optimization tool to satisfy a failure criterion that accounts for differences in compressive and tensile strengths of the printed 3D object, whereby the printed 3D object is able to withstand the maximum compressive and tensile stresses while under load.

16. The system of claim 15, wherein the structural optimization tool generates the interior topology by initially hollowing out the object and defining a uniform wall thickness for an outer wall and then by moving material from regions of the outer wall with lower stresses to regions of the outer wall with higher stresses to define the plurality of wall thicknesses, and wherein the regions of higher stresses are associated with locations of stresses created by the set of worst-case loads.

17. The system of claim 15, wherein the failure criterion is based on the Bresler-Pister criterion.

18. The system of claim 15, wherein the load conditions include a set of unparameterized loads including at least one of self-weight loads and thermal loads.

19. The system of claim 15, wherein the load conditions include a set of parameterized loads including at least one of wind loads and live loads.

20. A 3D printer system, comprising:
memory storing a 3D model of an object that defines an exterior geometry of the object;
an optimization tool performing the following steps:
defining material parameters for a build material;
defining loading conditions for the object; and
generating an output printer file for a 3D printer using the build material, wherein the generating includes optimizing an internal structure of the object while maintaining the exterior geometry, wherein the optimizing of the internal structure includes hollowing the object and defining two or more thicknesses for an outer wall while minimizing stresses and volume of the build material used to print the object, and wherein the two or more thicknesses for the outer wall are in at least one single layer of the output printer file; and
a 3D printer that prints a 3D object using the output printer file, wherein the two or more wall thicknesses satisfy a failure criterion that accounts for differences in compressive and tensile strengths of the printed 3D object, and wherein the loading conditions include a set of unparameterized loads including at least one of self-weight loads and thermal loads and further include a set of parameterized loads including at least one of wind loads and live loads.

21. The system of claim 20, wherein the optimizing of the internal structures includes modifying connectivity of the internal structure, whereby a strength-to-weight ratio of the object is increased.

22. The system of claim 20, wherein the optimizing of the internal structure includes distributing a predefined material budget for printing the object with the 3D printer with the build material to reduce stresses caused by worst-case loads under the loading conditions.

* * * * *